Sept. 20, 1971     G. A. P. WAPLINGTON     3,606,501
HYDROSTATIC BEARING ASSEMBLIES
Filed Nov. 20, 1969     7 Sheets-Sheet 1
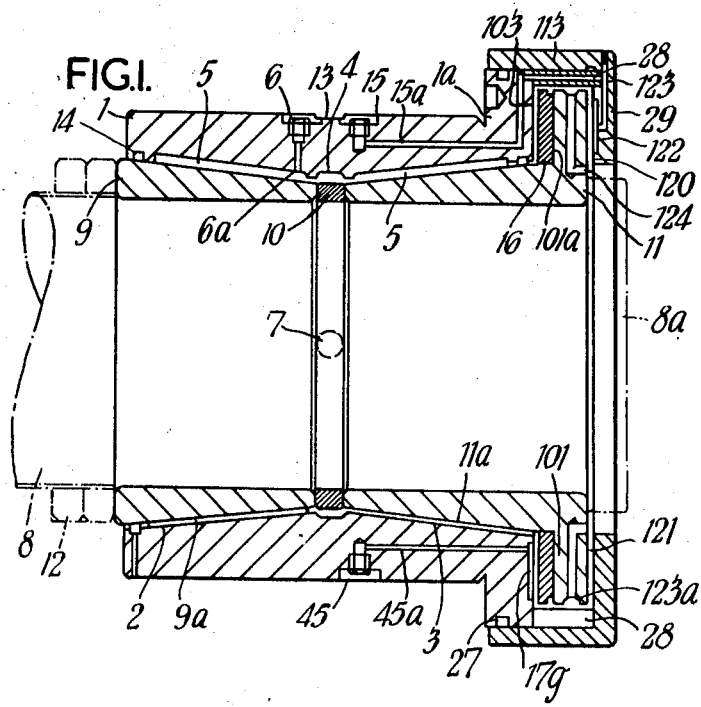
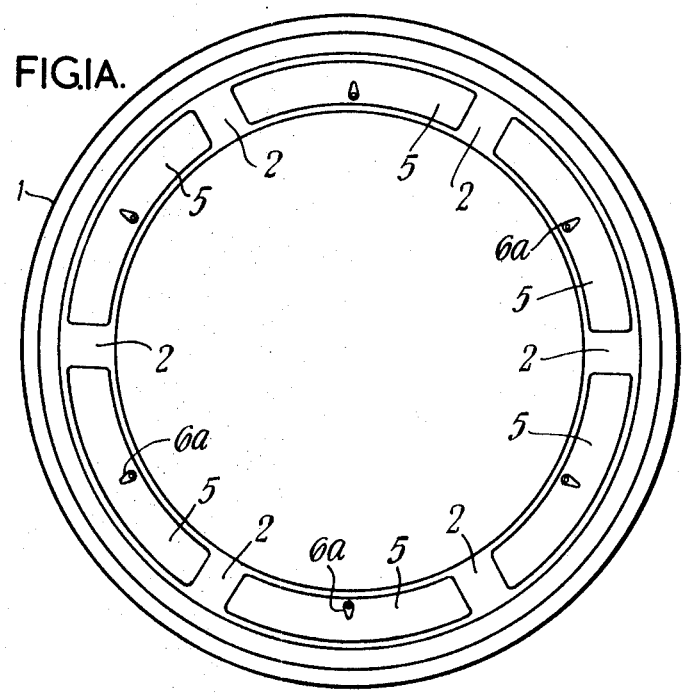

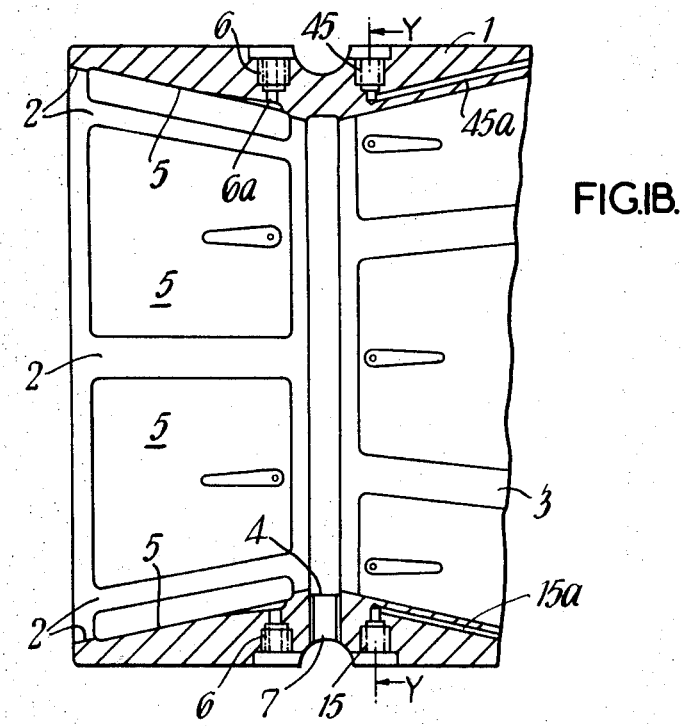
FIG.IB.
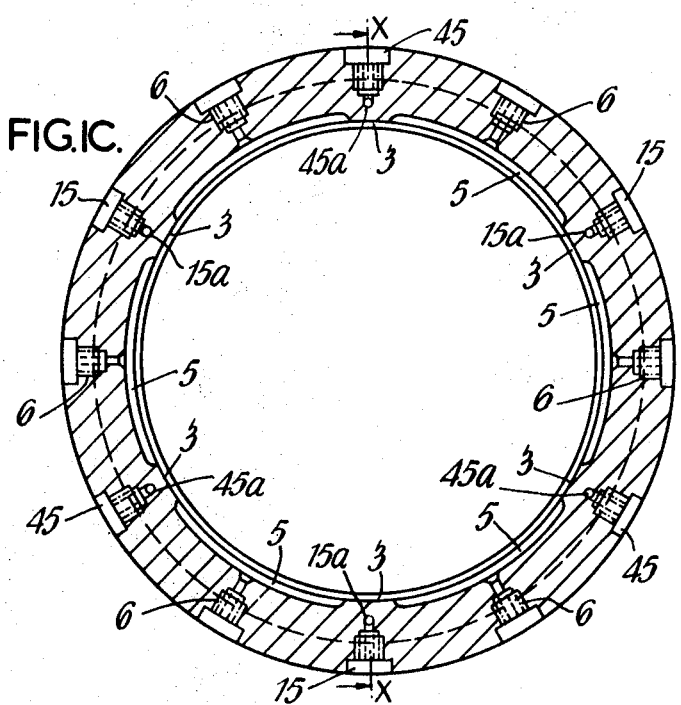
FIG.IC.

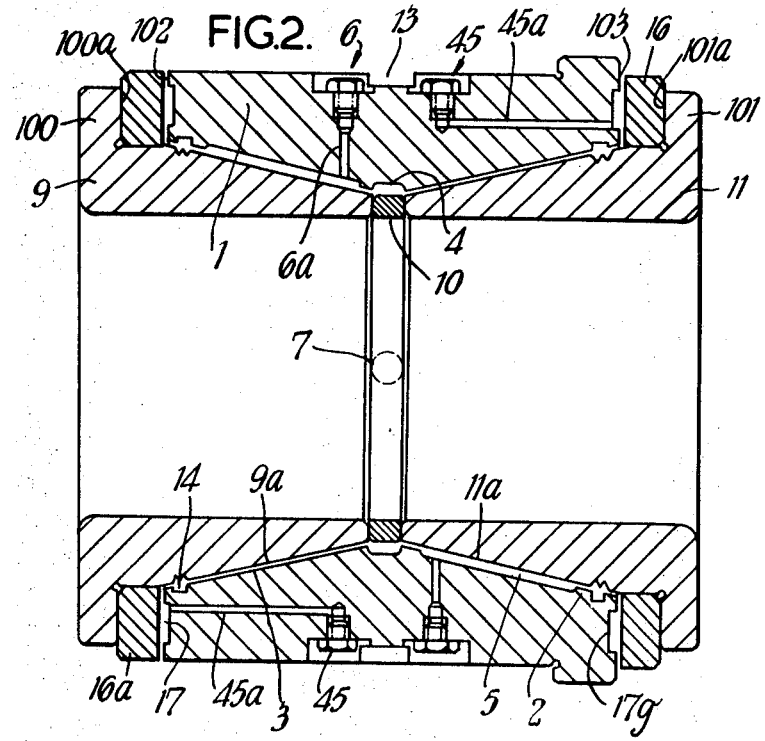

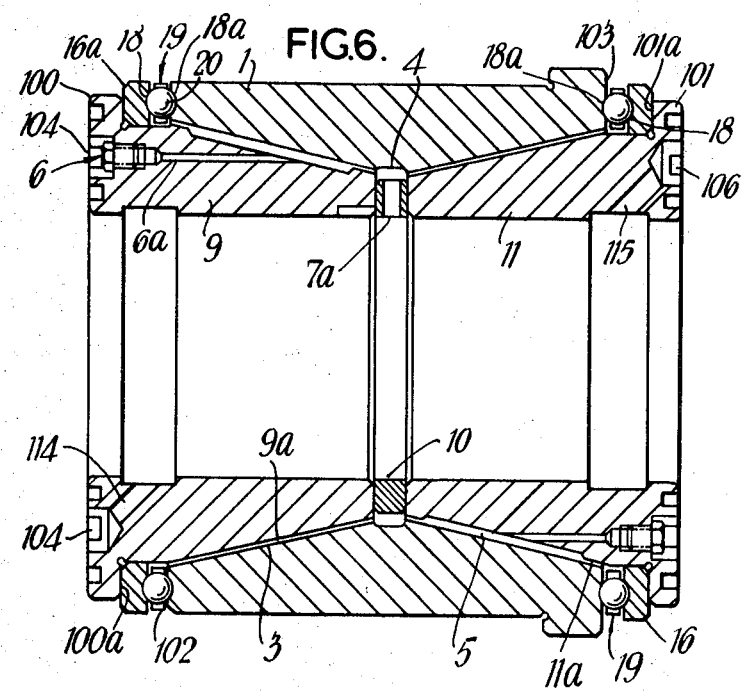
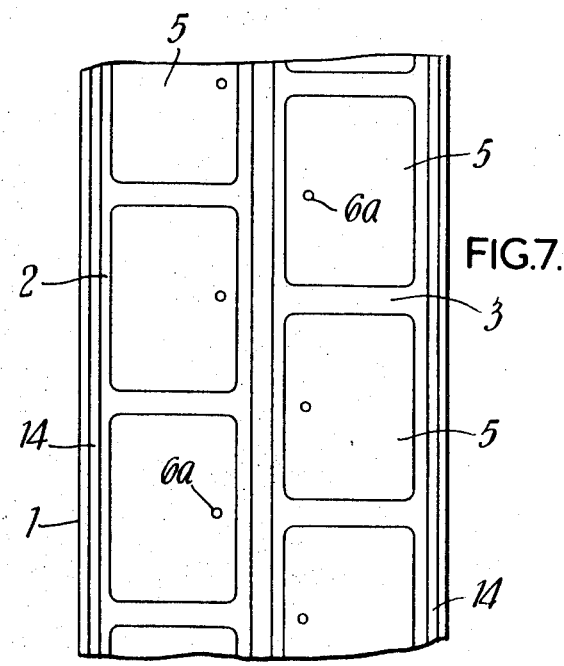

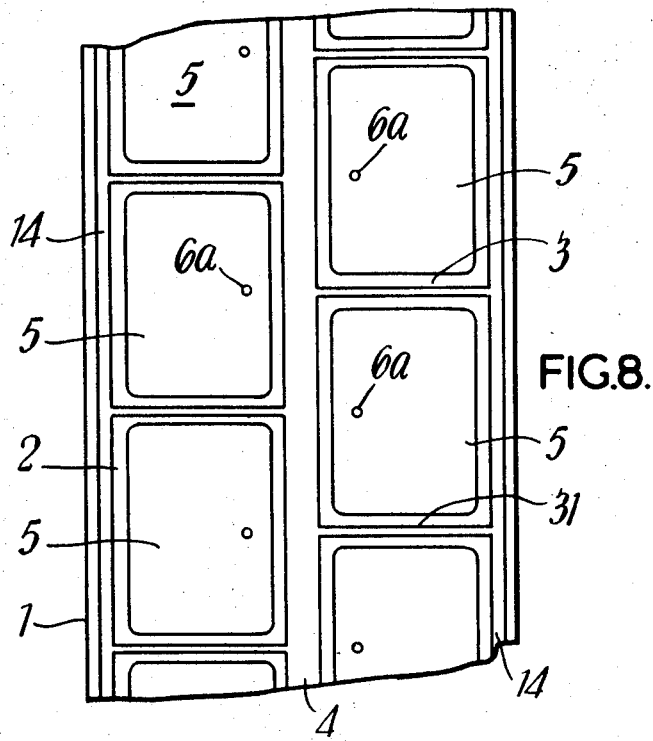
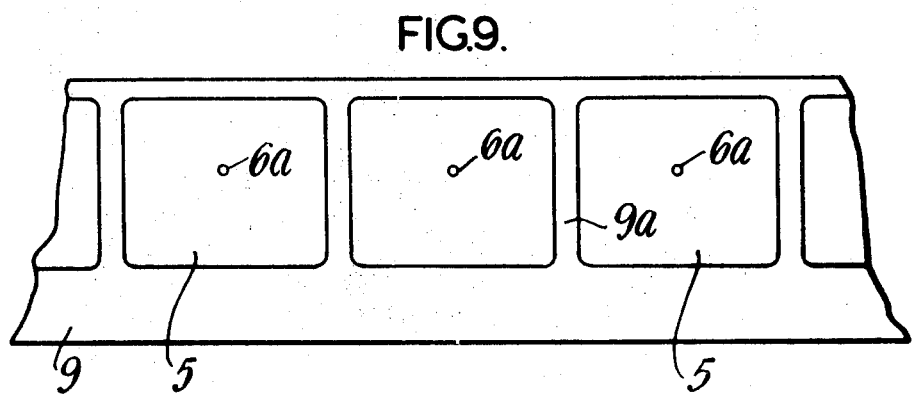

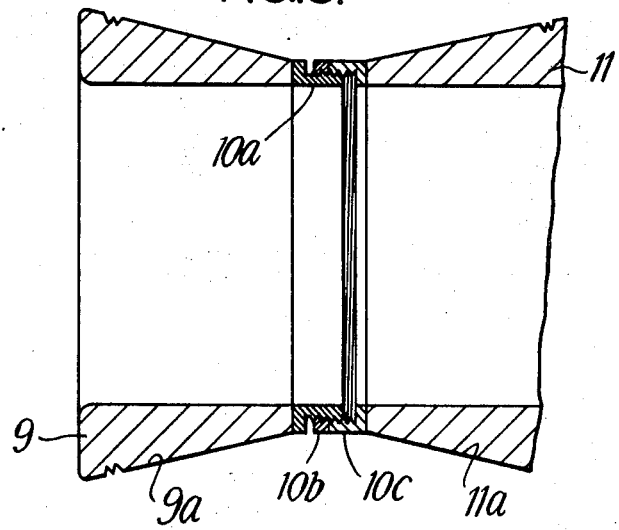
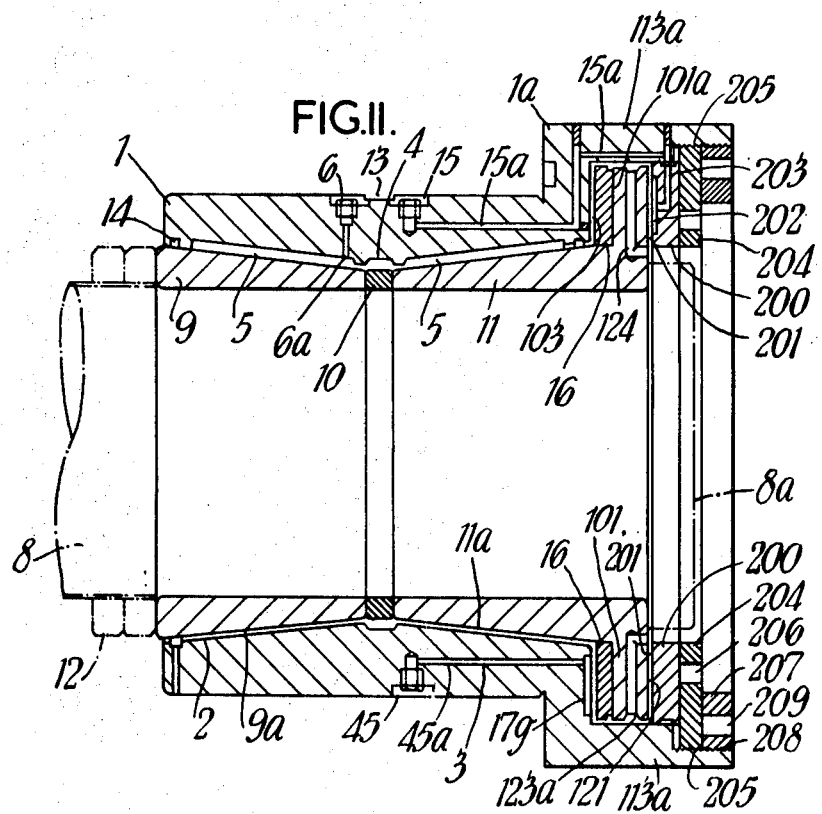

United States Patent Office

3,606,501
Patented Sept. 20, 1971

3,606,501
HYDROSTATIC BEARING ASSEMBLIES
Gerald Andrew Pearson Waplington, Colchester, England, assignor to Gamet Products Limited, Hythe, Colchester, Essex, England
Filed Nov. 20, 1969, Ser. No. 878,277
Claims priority, application Great Britain, Dec. 24, 1968, 61,277/68
Int. Cl. F16c *17/10, 21/00*
U.S. Cl. 308—122
36 Claims

ABSTRACT OF THE DISCLOSURE

The specification discloses a hydrostatic bearing assembly in which two frusto-conical sleeve members are mounted on a shaft in axial relationship with the frusto-conical surfaces converging towards their adjacent ends, the frusto-conical sleeve members being mounted within an outer bearing element having a pair of frusto-conical surfaces complementary to the frusto-conical surfaces of the sleeve members and in opposed relationship thereto, means being provided to form hydrostatic pads between each pair of opposed frusto-conical surfaces, said pads providing restaint against movement both in a radial sense and in an axial sense of the outer bearing element relative to the shaft and in which auxiliary bearing means is provided between at least one sleeve member and the outer bearing element to provide additional restraint to relative axial movement between the outer bearing element and the shaft in at least one sense of axial direction.

---

This invention relates to hydrostatic bearing assemblies and in particular to such assemblies as are known in the art as journal bearings or thrust bearings or combined journal and thrust bearings.

Hydrostatic journal bearings have hitherto been proposed in which hydrostatic pads are provided between bearing surfaces in a housing and bearing surfaces on a shaft so that during relative axial rotation between the shaft and housing the hydrostatic pads restrain, on the application of an external load to the assembly, relative displacement between the shaft and housing in a radial sense and in an axial sense. In providing such restraint it is essential, for efficient operation, to ensure that clearances between the opposed bearing surfaces of the shaft and housing are controlled within predetermined limits which are in turn related to an independently controlled rate of delivery of fluid to the said hydrostatic pads, these conditions being optimised to suit a particular case. Hitherto the provision of such clearances has necessitated in machining the radial and axial dimensions of the bearing surfaces to close tolerances, and having optimised the assembly, it has been impractical to carry out changes which may later arise requiring re-optimisation of the assembly.

It is an object of the present invention to provide a hydrostatic bearing assembly which is independent both of a shaft and of a housing which is to be mounted relative thereto by the bearing assembly so that relative axial rotation can be imparted between the shaft and housing and in which restraint is applied by hydrostatic pads to relative displacement between inner and outer elements of the bearing assembly produced by displacement of the shaft relative to the housing in a radial sense and in an axial sense.

It is a further object of the present invention to provide a hydrostatic bearing assembly in which clearances between the opposed bearing surfaces and general optimisation can be adjusted and changed as required.

According to the present invention there is provided a hydrostatic bearing assembly which includes two sleeve members adapted to be removably secured to a shaft or the like in axial relationship, each of the sleeve members having an external surface of frusto-conical form, the frusto-conical surfaces converging towards the adjacent ends of the sleeve members and being adapted to provide bearing surfaces for the shaft; an outer bearing member capable of being removably secured to a housing which housing and shaft are intended for relative axial rotation; the bearing surfaces for the shaft being located within the outer bearing member and the outer bearing member having a pair of internal frusto-conical bearing surfaces which are complementary to the frusto-conical surfaces of the sleeve members and are adapted to be located in opposed relationship to, and one with each of, the frusto-conical surfaces of the sleeve members; recess means and fluid passage means for connection to a source of hydraulic fluid under pressure by which hydrostatic pads can be formed between the opposed frusto-conical bearing surfaces so that when the sleeve members are secured to a shaft or the like and hydrostatic pads are formed between the opposed frusto-conical bearing surfaces, relative axial rotation can take place between the outer bearing member and the shaft and the frusto-conical bearing surfaces provide restraint against relative movement in the axial direction between the outer bearing member and the shaft, and wherein auxiliary bearing means is provided between one sleeve member having a frusto-conical bearing surface and the outer bearing member which auxiliary bearing means is adapted, when the sleeve members are secured to a shaft, to provide additional restraint to relative axial movement between the outer bearing member and the shaft in one sense of axial direction whilst permitting relative axial rotation between the outer bearing member and the shaft.

The hydrostatic bearing assembly of the present invention is generally understood in the field of rolling element bearings as an interchangeable packaged assembly which is adapted to be located within prepared diameters in the housing and upon the shaft when the latter is of cylindrical form.

By use of the opposed pairs of frusto-conical bearing surfaces, the hydrostatic bearing assembly offers both radial and axial support to the shaft. Although the effect of the inclined frusto-conical bearing surfaces in restraining relative movement between the shaft and housing has been found efficient in operations with light loads, when the bearing assembly is subjected to heavy loads in an axial sense it may be found that relative axial movement can take place between the housing and shaft. To improve the axial stiffness and thereby overcome this problem the bearing assembly of the present invention incorporates one or more auxiliary bearing means which provide additional axial bearing support to that which eminates from the frusto-conical bearing surfaces of the assembly. The auxiliary bearing means is located between the outer bearing member and either or both the sleeve members having the frusto-conical bearing surfaces in such a way to restrain relative movement in one or both senses of axial direction between the sleeve members and the outer bearing members.

Conveniently, the auxiliary bearing means reacts through a pair of substantially opposed thrust faces which are situated one on the outer bearing member and the other on one of the sleeve members having the frusto-conical bearing surface. The opposed thrust faces are substantially normal to the axis of the frusto-conical surfaces and the auxiliary bearing means provides a reaction through the opposed thrust faces in one sense of axial direction to restrain relative axial displacement of the opposed thrust faces towards each other.

In order to control clearance for the auxiliary bearing means, auxiliary spacer means may be located between the opposed thrust faces and through which reaction from the auxiliary bearing means is imparted to the opposed thrust faces. Further, the auxiliary spacer means is preferably removably located so that it can be replaced by, or adjusted to provide, auxiliary spacer means of appropriate axial length if an alteration is made in the clearances between the opposed frusto-conical surfaces.

In addition, or alternatively, clearance for the auxiliary bearing means may be controlled by providing means whereby one of the opposed thrust faces for the auxiliary bearing means is axially adjustable relative to the other opposed thrust face, such adjustment conveniently being achieved by screw threaded adjustment of a plate which carries or determines the position of one of the opposed thrust faces relative to the other face.

If required, auxiliary bearing means can be used to restrain relative axial movement in both senses of axial direction between the frusto-conical sleeve members and outer bearing member. In such an assembly two pairs of substantially opposed thrust faces can be provided and auxiliary bearing means is located between the opposed thrust faces of each pair so that the reaction of the auxiliary bearing means through one pair of thrust faces restrains relative movement between the sleeve members and the outer bearing member in one sense of axial direction and the reaction of the auxiliary bearing means through the other pair of thrust faces restrains relative movement between the sleeve members and outer bearing member in the opposite sense of axial direction. Conveniently one pair of thrust faces are situated between the outer bearing member and one of the frusto-conical sleeve members and the other pair of thrust faces are situated between the other frusto-conical sleeve member and the outer bearing member. Alternatively, a thrust face of each pair can be located on a common (the same) frusto-conical sleeve member. Auxiliary spacer means may be provided between the opposed thrust faces in each pair.

The auxiliary bearing means can be in the form of a hydrostatic bearing comprising one or more hydrostatic pads in which case one of the opposed thrust faces in the or each pair can be suitably recessed for the formation of such pads. Alternatively, the auxiliary bearing means can be provided by a roller bearing as, for example, bearings which utilize roller elements of frusto-conical, spherical or cylindrical configuration as the axial bearing component.

By incorporating auxiliary bearing means, the axial length of the auxiliary spacer means or clearance set between the opposed thrust faces is predetermined, in part, by the preestablished position of one of the frusto-conical sleeve members by virtue of the auxiliary bearing means provided between that frusto-conical sleeve member and the outer bearing member; i.e. the relative axial positioning between one of the frusto-conical sleeve members and the outer bearing element is determined by the auxiliary bearing means.

Preferably, the hydrostatic bearing assembly of the present invention further includes spacer means which is adapted to be located axially betwen the frusto-conical sleeve members. The spacer means has a predetermined axial length and is arranged so that, during assembly of the bearing, clearance between each frusto-conical bearing surface of the sleeve members and its opposed frusto-conical bearing surface of the outer bearing member is adjustable by use of spacer means having an appropriate axial length. As above mentioned, by incorporating auxiliary thrust bearing means the position of one of the frusto-conical sleeve members is predetermined with respect to the outer bearing member by the auxiliary spacer means or clearance set between the opposed thrust faces and in such case the spacer means is adjusted or incorporated to provide optimum conditions in relative radial clearance positioning between the outer bearing member and the outer frusto-conical sleeve member.

The spacer means can comprise two or more adjustably connected elements by adjustment of which the axial length of the spacer means can be adjusted to, and locked or secured at, a predetermined axial length. Alternatively the spacer means can comprise one or more elements of predetermined length which are adapted to be removably located axially between and in abutting relationship with the sleeve members on the shaft so that variations in clearance is achieved by changing the element or elements for ones which have an axial length which provides the required clearance.

Preferably the spacer means is removably located axially between the sleeve members and is adapted to be carried on the shank. Alternatively, and particularly in a construction in which the spacer means comprises two or more adjustably connected (as for example by screw thread) elements, the spacer means can be carried on either or both sleeve elements.

In a preferred arrangement of the present invention a shaft carries three sleeve members in axial and abutting relationship, the inner sleeve member comprising spacer means and two axially outermost sleeve members having external frusto-conical surfaces which converge towards the spacer member and are removably secured to the shaft so that the frusto-conical surfaces provide radial bearing surfaces for the shaft. One of the axially outermost members has a radially outwardly extending flanged portion, one axially directed outer face of which flange provides an axial thrust bearing surface and the other axially directed outer face of the flange provides an axial abutment face for a collar which is used as auxiliary spacer means.

The bearing surfaces for the shaft are located within an outer bearing member which can be secured to a housing (the shaft and housing being intended for relative axial rotation). The outer bearing member has a pair of internal frusto-conical bearing surfaces which are complementary to the frusto-conical surfaces of the sleeve members and are in opposed relationship one with each of the bearing surfaces of the outer sleeve members. The outer bearing member has a radially extending, axially directed face at one of its axial extremities which provides an axial bearing face which, on assembly, is located in axial opposition to and operates in relation to the aforementioned collar.

An opposing axial thrust bearing surface is provided to the aforementioned axial thrust bearing surface by an inner radially extending face of a thrust cap mounted on the outer bearing member. The bearing clearance between the axially directed outer face of the flanged frusto-conical sleeve member and the inner face of the thrust cap may be controlled by an auxiliary spacer element mounted within the said thrust cap.

Recesses are provided in the frusto-conical surfaces of either the outer bearing member or the outer sleeve members and also in the axially directed thrust bearing surfaces of the thrust cap and outer bearing member. Fluid passages are provided to serve a plurality of interchangeably mounted fluid restrictions in the form of capillaries or jets which communicate with the recesses and through which hydraulic fluid under pressure can be passed to form a plurality of peripherally spaced hydrostatic pads being the opposed frusto-conical bearing surfaces, and between the two pairs of opposed axially directed bearing surfaces. The clearance between each frusto-conical surface of the outer sleeve members and the opposed frusto-conical surface of the outer bearing and between the opposed axially directed thrust bearing surfaces of the outer flanged sleeve member and the outer bearing member can be altered by use of spacer means and auxiliary spacer means of appropriate axial length.

Several embodiments of the present invention will now be described, by way of example only, with reference to the accompanying illustrative drawing in which:

FIG. 1 is an axial section through a bearing assembly constructed in accordance with the present invention in which the auxiliary thrust bearing means is in the form of hydrostatic pads and which auxiliary bearing means reacts through one of the axially outermost sleeve members to restrain relative movement in either sense of axial direction between the outer bearing member and the sleeve members;

FIG. 1A is an end view of the outer bearing member incorporated in the assembly of FIG. 1;

FIG. 1B is part of an axial cross-section of the outer bearing member shown in FIG. 1A and taken on the line X—X of FIG. 1C;

FIG. 1C is a radial cross-section of the outer bearing member shown in FIG. 1A and taken on the line Y—Y of FIG. 1B;

FIG. 2 illustrates an axial section through an alternative embodiment of the present invention in which the auxiliary bearing means is in the form of hydrostatic pads and which auxiliary bearing means react through both of the axially outermost sleeve members to restrain relative axial movement between the outer bearing member and sleeve members in either sense of axial direction;

FIG. 3 is an axial section through a further alternative embodiment of the present invention in which the auxiliary bearing means is in the form of a ball roller bearing which is adapted to restrain relative axial movement between the outer bearing member and the sleeve members in one sense of axial direction;

FIG. 6 is an axial section through a bearing assembly of the present invention and illustrates a modification of the assembly shown in FIG. 5 in which the sleeve members are intended to be secured to a stationary shaft and the auxiliary bearing means comprises ball roller members.

FIG. 7 illustrates part of the internal frusto-conical bearing surfaces suitable for use on the outer bearing member, said surfaces incorporating two peripherally spaced arrays of recesses which are situated one in each frusto-conical bearing surface and within which hydrostatic pads are adapted to be located;

FIG. 8 illustrates a modification of the surfaces shown in FIG. 7 in which a system of channels is provided in the frusto-conical surfaces of the outer bearing member which channels are adapted to facilitate in the escape of hydraulic fluid from between the opposed frusto-conical bearing surfaces which fluid results by leakage from the hydrostatic pads;

FIG. 9 illustrates part of a frusto-conical bearing surface suitable for use on each axially outermost sleeve member, said surface incorporating a peripherally spaced array of recesses within which hydrostatic pads are adapted to be located;

Figure 4:
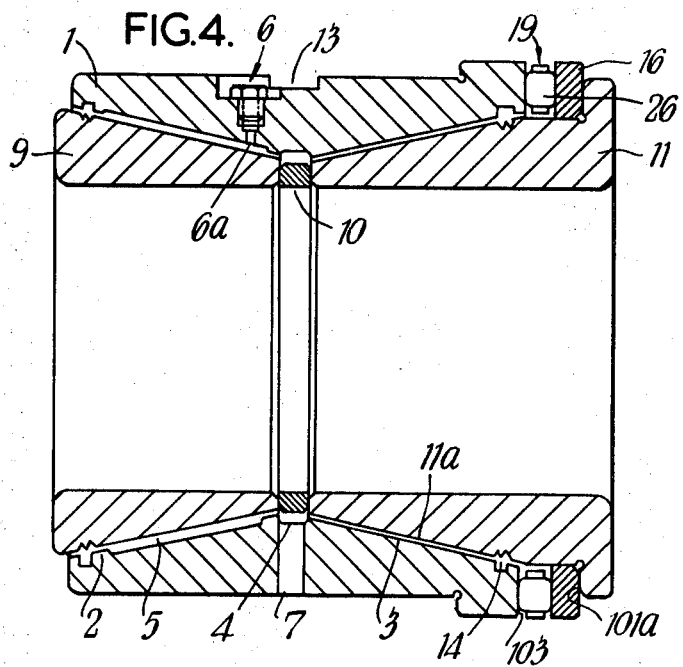
FIG. 4 is an axial section through a bearing assembly of the present invention and illustrates a modification of the assembly shown in FIG. 3 in which the auxiliary bearing means is provided by a cylindrical roller bearing.

FIG. 10 shows part of the frusto-conical sleeve members of the assembly in FIG. 1 and illustrates a modification in which the spacer means comprises two adjustably connected elements by adjustment of which the axial length of the spacer means can be altered as required; and FIG. 11 is an axial section through a bearing assembly which is a modification of the assembly shown in FIG. 1 and in which clearance for the hydrostatic pads of the auxiliary thrust bearing means is axially adjustable by screw thread.

Where possible throughout the following description, the same parts or members in each of the figures have been accorded the same references.

Referring firstly to FIGS. 1 and 1A to 1C, the hydrostatic bearing assembly shown generally in FIG. 1 includes an outer bearing member 1 which defines a pair of axially spaced internal bearing surfaces 2 and 3 which are co-axial and of frusto-conical form and diverge from a position within the body to provide the ends of a passage which extends through the outer bearing member. An internal cylindrical land 4 is provided in the member 1 between the bearing surfaces 2 and 3 which land 4 is slightly recessed from the adjacent ends of the bearing surfaces. Each of the bearing surfaces 2 and 3 is provided with a plurality of peripherally spaced recesses 5. In the embodiment shown in FIGS. 1 and 1A to 1C, six peripherally spaced recesses 5 are provided in each of the bearing surfaces 2 and 3. Carried in the outer bearing member 1 are a plurality of restrictors 6 which communicate by way of passages 6a in the member 1, one with each of the recesses 5 and through which restrictors and passages the recesses 5 are adapted to communicate with a source of hydraulic fluid under pressure (not shown).

In FIG. 1 the outer bearing member 1 is illustrated housing a cylindrical shaft shown generally at 8. The shaft carries three sleeve members, 9, 10 and 11 which are arranged in axial and abutting relationship on the shaft within the outer bearing member 1. The sleeve members are assembled on the shaft and are removably secured thereto by a pair of locking nuts shown generally at 12 which are in screw threaded connection with the shaft to urge the sleeve members against a locating flange 8a on the shaft.

The sleeve member 10 is of annular form and provides an axial spacer member or element between the two axially outermost sleeve members 9 and 11. The outer sleeve members 9 and 11 have external bearing surfaces 9a and 11a respectively which are of frusto-conical form and complementary to the bearing surfaces 2 and 3 respectively. The sleeve members are secured to the shaft 8 so that the conical surfaces 9a and 11a converge towards the spacer member 10.

In an operative condition the bearing assembly is arranged so that the bearing surfaces 2 and 9a are opposed as are the bearing surfaces 3 and 11a and the outer bearing member 1 can be securely mounted in a suitable stationary housing (not shown) within which the shaft 8 is intended to exhibit axial rotation. Flow of hydraulic fluid under pressure through the restrictors 6 and passages 6a into each of the recesses 5 causes hydrostatic pads to be formed between the recesses and the frusto-conical bearing surfaces 9a and 11a to facilitate relative axial rotation between the outer bearing member and the shaft. The opposed inclined bearing surfaces restrain relative radial movement between the outer bearing member and the sleeve members and effectively restrain relative axial displacement in either sense of axial direction between the outer bearing member and the sleeve members 9 to 11 (and thereby the shaft 8).

The embodiment shown in FIG. 1 incorporates auxiliary bearing means in the form of hydrostatic pads to provide additional restraint to relative axial movement between the outer bearing member and the sleeve members in either sense of axial direction. The outer sleeve member 11 has an external radially extending flange 101 which is located adjacent the end part of largest diameter of its frusto-conical surface. The flange 101 has, on each side thereof, axially directed faces 101a and 121, and auxiliary bearing means in the form of a hydrostatic bearing is adapted to react on the flange 101 against the side face 121. The outer bearing member 1 has a flange 1a on which is securely mounted a thrust cap 113 which provides an extension portion of the bearing member 1 and extends axially over the flange 101 of the outer sleeve member 11. The thrust cap 113 is provided with an inwardly directed flange 29 having an axially directed side face 120. The side face 120 is located opposite to the side face 121 of the flange 101. The side faces 120 and 121 are in a plane which is substantially normal to the axis of the frusto-conical surfaces and effectively provide a pair of opposed thrust bearing surfaces. Located in the face 120 are a peripherally spaced array of recesses 122 which communicate through a passage 123 with a passage 15a through which hydraulic fluid under pressure is supplied by way of a restrictor 15. When fluid under pressure is passed through the restrictor 15 and passage 15a a hydrostatic pad is formed in each of the recesses 122.

The flange 1a has an axially directed and radially extending side face 103 which is located opposite to the side face 101a of the flange 101. Interposed between the side faces 103 and 101a is auxiliary spacer means in the form of an annular collar 16 which abuts the side face 101a and is carried on the sleeve member 11 as a light interference fit on a prepared external diameter of the sleeve member. Provided in the side face 103 are a peripherally spaced array of recesses 17g and hydrostatic pads (to oppose the pads formed in recesses 122) are formed in the recesses 17g by supplying hydraulic fluid under pressure thereto by way of passages 45a and restrictors 45. As the side face 103 is substantially normal to the axis of the frusto-conical surfaces it effectively provides an opposed thrust face to the face 101a of the flange 101 which is part of the sleeve member 11. In order to facilitate the regulation of both the radial bearing clearance in the frusto-conical section of the bearing and the axial bearing clearance in the auxiliary bearing means the collar 16 is mounted on a parallel diameter of the sleeve member 11 and axially located against the side face 101a to extend radially parallel to the side face 103. The hydrostatic thrust bearing pads in recesses 17g therefore react upon the flange 101 of the sleeve member 11 by thrusting against the exposed axially directed face of the collar 16.

Consequently with the sleeve members 9 to 11 secured to a shaft relative axial movement between the shaft and outer bearing member is restrained in one sense by the effective thrust bearing of the hydrostatic pads formed in the recesses 122 and in the opposite sense by the effective thrust bearing of the hydrostatic pads formed in the recesses 17g. To accommodate for fluid leakage from the pads in recesses 17g and 122 the periphery of the flange 101 is provided with an annular recess 123a which is in permanent communication with exhaust through a passage 124 in the flange 101.

Each restrictor 6, 15 and 45 is conveniently located in a recess 13 through which suitable high pressure conduits can be connected. The outer bearing member 1 defines a passage 7 which opens at one end in the land 4 and at the other end communicates with exhaust or is adapted to be connected to a fluid reservoir.

Efficient operation of the hydrostatic bearing assembly depends, to a considerable extent, upon the clearances which are provided between the opposed bearing surfaces.

In the embodiment shown in FIG. 1 relative axial displacement which is possible between the outer bearing member 1 and sleeve member 11 depends upon the axial length of an auxiliary spacer element in the form of an annular ring 28 which is located between the flange 1a and the thrust cap 113. The ring 28 is of a predetermined axial length and ensures that when the thrust cap 113 is secured to the flange 1a a required spacing is obtained between the opposed side faces 103 and 120. Optimised hydrostatic bearing clearances in an axial sense may therefore be obtained by adjustment to one axial length of the annular ring 28.

Further, relative radial clearance between the outer bearing member 1 and sleeve member 11 depends upon the axial length of the collar 16. A reduction in the axial length of the collar 16 permits the side face 101a of sleeve member 11 to move axially towards the side face 103 of the outer bearing member 1, thus reducing the radial bearing clearance between the frusto-conical faces 3 and 11a. Optimised hydrostatic bearing clearances in a radial sense between sleeve member 11 and outer bearing member 1 may therefore be obtained by adjustment of the axial length of the spacing collar 16. Adjustment to the axial length of collar 16 affects the optimisation of the axial hydrostatic auxiliary bearing, therefore identical axial adjustment would be required to the annular ring 28 in order to restore the required conditions.

In the embodiment shown in FIG. 1 relative radial bearing clearance between outer bearing member 1 and sleeve member 9 depends upon the axial length of the spacer sleeve. A reduction in the axial length of sleeve member 10 permits the sleeve member 9 to move axially into outer bearing member 1. By causing sleeve member 9 to advance axially towards sleeve member 11 (which sleeve member 11 may have been optimised as previously described and therefore be already in a predetermined position) the axial movement of sleeve member 9 produces a reduction in radial bearing clearance between the opposed frusto-conical bearing surfaces 2 and 9a. Optimised hydrostatic bearing clearances in a radial sense between sleeve member 9 and body 1 may therefore be independently obtained by adjustment to the axial length of the sleeve member 10.

All conditions of bearing clearances, both axial and radial, embodied in the construction shown in FIG. 1 may thereby be independently adjusted to suit the optimum hydrostatic bearing conditions required of the assembly for its intended use.

Leakage of hydraulic fluid from the recesses 5 into the annular recess 4 between the bearing surfaces 2 and 3 is effectively removed through the passage 7. Relief channels (for example, annular recesses 14 in the frusto-conical surfaces towards the end part of larger diameter thereof) are provided in the sleeve members 9 and 11 and outer bearing member 1 which channels are adapted to collect hydraulic fluid which results by leakage from pads in the recesses 5 and which fluid is not displaced into the annular recess 4. The fluid pressure at the point of leakage from the pads in recesses 5 may be substantial and the provision of such channels 14 provides for a reduction of pressure to near atmospheric conditions thereby permitting controlled egress of fluid from the assembly to a fluid reservoir and also avoiding wastage.

Although in the construction above described and illustrated with reference to FIG. 1 the auxiliary bearing means is adapted to be provided by hydrostatic pads, it is to be realised that the auxiliary bearing means can be provided by roller bearings as will hereinafter be described with reference to FIGS. 3, 4 and 6.

In the embodiment shown in FIG. 2 the outer sleeve member 9 is provided with an external annular flange 100 which is located adjacent the end part of larger diameter of its frusto-conical surface 9a in a similar manner to the flange 101 of the sleeve member 11. The flanges 100 and 101 project radially over the outer bearing member 1 and the flange 100 has a side face 100a which is machined to lie in a plane substantially normal to the axis of the frusto-conical surfaces and the flange 101 is similarly machined to provide its side face 101a which is opposed to the side face 100a. The outer bearing member 1 is provided with a pair of axially spaced side faces 102 and 103 which are machined to lie in planes substantially normal to the axis of the frusto-conical bearing surfaces. The side faces 100a and 102 are oppositely located and the side faces 101a and 103 are oppositely located and respectively form pairs of opposed thrust faces.

Removably located on the outer sleeve member 11 and seated between the opposed thrust faces 101a and 103 and adjacent and in abutting contact with the side face 101a is auxiliary spacer means in the form of the annular collar 16 the radially extending side faces of which are substantially parallel with the face 103. Auxiliary spacer means in the form of a further annular collar 16a is similarly removably located on the outer sleeve member 9 and seated adjacent and in abutting contact with the side face 100a. Located between the opposed thrust faces 101a and 103 is first auxiliary bearing means and located between the opposed thrust faces 100a and 102 is second auxiliary bearing means. The first and second auxiliary bearing means are adapted in the present embodiment, to be in the form of hydrostatic bearings and to provide such a peripherally spaced array of recesses 17 are formed in the side face 102 similar to the peripherally spaced array of recesses 17g formed in the side face 103. Each of the recesses 17 and 17g is adapted to be connected to a source of hydraulic fluid under pressure by way of passages 45a in the outer bearing member 1 and restrictors 45.

When fluid pressure is applied to the restrictors 6 and 45 in FIG. 2, hydrostatic pads are formed between the frusto-conical bearing surfaces in the manner above described with reference to FIG. 1 and are simultaneously formed in the array of recesses 17 and 17g between the side faces 102 and 103 and the opposed side faces of annular collars 16 and 16a respectively. By such an arrangement, the outer bearing member 1 can be secured to a stationary housing and a shaft which carries the sleeve members 9 to 11 can be rotated within the housing on the hydrostatic pads and relative axial displacement in either sense of axial direction between the housing and sleeve members is additionally restrained by thrust bearings which are in effect formed by the reaction of the hydrostatic pads in recesses 17 and 17g through the annular collars and the opposed thrust faces.

It will be apparent that if the clearances between the opposed frusto-conical bearing surfaces is altered by substituting a given spacer sleeve member 10 for one of a different axial length it is necessary, in order to maintain efficient operation of the auxiliary bearing means formed by the hydrostatic pads in the recesses 17 and 17g, for the clearances between the side faces 102 and 103 and their respectively adjacent annular collars also to be adjusted to maintain the required clearance for optimum efficiency. Such adjustment is easily effected by replacement of the annular collars 16 and 16a by similar collars of appropriate axial length.

If required the peripherally spaced array of recesses 17 can be replaced by a single annular recess as can the array of recesses 17g.

In the embodiment shown in FIG. 3 auxiliary bearing means is incorporated but in this construction only one auxiliary bearing in the form of a ball roller bearing 19 is provided and such an arrangement is utilised where it is necessary only to provide additional restraint to relative axial movement between the outer bearing member and sleeve members in one sense of axial direction. It will be apparent from FIG. 3 that additional restraint is afforded against relative axial displacement in a direction which corresponds to movement of the opposed thrust faces 101a and 103 towards each other.

In FIG. 3 the annular collar 16 is located between the side face 103 and the roller bearing 19 but it will be appreciated that a similar arrangement can be used to that shown and hereinafter described with reference to FIG. 4 if required. A similar construction to FIG. 3 is effectively shown in FIG. 4 in which the roller bearing 19 comprises an array of cylindrical rollers 26. During relative rotation between the opposed thrust faces 101a and 103 each of the rollers 26 rotates about an axis which is radially disposed relative to the axis of the frusto-conical surfaces.

Figure 5:
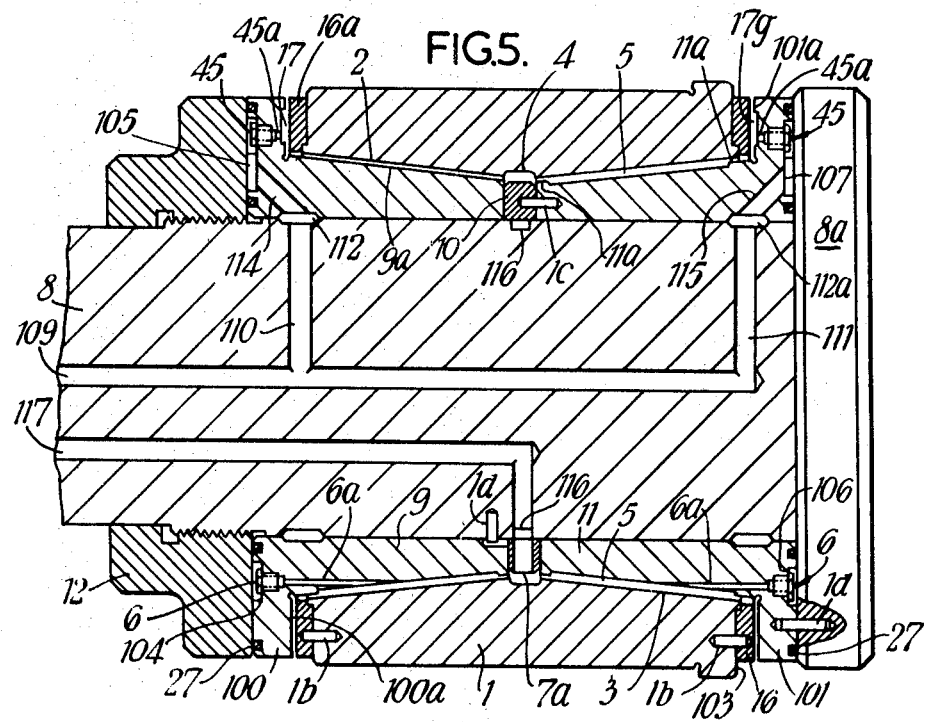
FIG. 5 is an axial section through a hydrostatic bearing assembly of the present invention in which the sleeve members are secured to a stationary shaft and fluid passages to pad location recesses are illustrated in a manner to facilitate axial rotation of the outer bearing member on the stationary shaft and in which the auxiliary bearing means is in the form of hydrostatic pads.

In the bearing assembly shown in FIG. 5 the sleeve members 9 to 11 are mounted on the shaft 8 and are retained on the shaft between the abutment flange 8a and the locking nut 12. The shaft 8 is intended to be stationary whilst the outer bearing member 1 (and housing when secured thereto) can exhibit axial rotation on the shaft and in this embodiment the annular recesses 5 are located in the frusto-conical bearing surfaces 9a and 11a and the associated restrictors 6 and fluid passages 6a to each of the recesses 5 are provided in the respective sleeve members 9 and 11. Each of the recesses 5 in the bearing surface 9a of outer sleeve member 9 communicates through its respective restrictor 6 and passage 6a with an annular recess 104 which is formed in a side face of the sleeve member 9. The recess 104 is effectively closed by the locking nut 12 to define a passage 105 with which each recess 5 in the bearing surface 9a communicates. Similarly each of the recesses 5 in the frusto-conical bearing surface 11a of sleeve member 11 communicates through its respective restrictor 6 and passage 6a with an annular recess 106 which is formed in a side face of the sleeve member 11. The annular recess 106 is effectively closed by the abutment flange 8a to form a passage 107 with which each recess 5 in the bearing surface 11a is in communication. O-ring seals 27 are provided to ensure that the annular recesses 104 and 106 are sealed by the locking nut 12 and abutment flange 8a respectively. Extending within the shaft 8 is a passage 109 which is adapted to be connected to a source of hydraulic fluid under pressure and is provided with branch passages 110 and 111 of which passage 110 communicates with a recess 112 provided in the periphery of the shaft 8 and the passage 111 communicates with a further recess 112a provided in the periphery of the shaft 8. A passage 114 in the outer sleeve member 9 communicates at one end with the passage 105 and the other end is located to be in constant communication with the recess 112. Similarly a passage 115 in the outer sleeve member 11 communicates at one end with the passage 107 and the other end is located to be in constant communication with the recess 112a. It will be apparent that, when the passage 109 is connected to a source of hydraulic fluid under pressure, fluid can flow by way of the passages 110, 111, 114, 115, 105 and 107 the restrictors 6 and passages 6a into the respective recesses 5 in the frusto-conical bearing surfaces 9a and 11a to form hydrostatic pads therein.

To accommodate for liquid leakages from the hydrostatic pads formed in the recesses 5 the spacer sleeve member 10 has an external diameter which is less than the diameter of the frusto-conical bearing surfaces 9a and 11a at their adjacent ends and the sleeve member 10 is provided with a hole 7a which passes radially therethrough and at its inner end is located to be in constant communication with a recess 116 provided in the periphery of the shaft 8. An exhaust passage 117 is located within the shaft 8 and communicates with the recess 116 so that fluid leakage from the hydrostatic pads in recesses 5 can pass by way of pasasge 7a, recess 116 and pasage 117 to a fluid reservoir.

In the construction shown in FIG. 5, the auxiliary bearing means is provided by hydrostatic pads which are arranged in a similar manner to that above described with reference to FIG. 2 to provide restraint to relative movement between the sleeve members 9 to 11 and outer bearing member 1 in both senses of axial direction. Similarly to the construction shown in FIG. 2, the sleeve members 9 and 11 in FIG. 5 are provided with annular flanges 100 and 101 respectively but in the embodiment of FIG. 5 the peripherally spaced array of recesses 17 and 17g are provided in the side faces 100a and 101a respectively of the flanges 100 and 101. Each of the recesses 17 is in permanent communication with the passage 105 by way of a passage 45a and a restrictor 45 carried in the sleeve 9 and similarly each of the recesses 17g is in permanent communication with the passage 107 by way of a passage 45a and a restrictor 45 carried in the sleeve 11. When the passage 109 is connected to a source of hydraulic fluid under pressure, fluid can flow by way of the restrictors 45 and the passages 45a from the annular passages 105 and 107 into the respective recesses 17 and 17g to form hydrostatic pads therein against the axially directed side faces of the collars 16a and 16 which are carried on the outer bearing member 1 to respectively abut the axially directed side faces 102 and 103 thereof. Conveniently the collars 16a and 16 are retained in abutting relationship with their respective side faces 102 and 103 of the outer bearing member 1 by pegs 1b, the sleeve members 9 to 11 are retained in the same relationship with respect to the shaft 8 by pegs 1c and the sleeve members 9 to 11 are restrained from rotation on the shaft 8 by pegs 1d.

In the bearing assembly shown in FIG. 6 the auxiliary bearing means provides restraint to relative axial movement between the outer bearing 1 and sleeve members in either sense of axial direction and each of the auxiliary bearing means is in the form of a roller bearing shown generally at 19. One roller bearing is located between the annular collar 16a and the side face 102 and a further roller bearing is located between the annular collar 16 and the side face 103. The roller bearings 19 incorporate ball rollers 20 and the opposing faces of the annular collar 16a, annular collar 16 and outer bearing member 1 between which the roller bearings are situated are provided with annular recesses shown generally at 18 and 18a which are of part cylindrical shape to locate the ball rollers 20 and provide tracks therefor. Relative rotation between the sleeve members and the outer bearing member causes the ball rollers 20 to move along their annular tracks and it will be apparent that the roller bearings effectively provide thrust bearings to restrain relative axial displacement between the outer bearing member and sleeve members in either sense of axial direction. To maintain efficient operation of the roller bearings, any adjustment which is made in the clearances between the frusto-conical bearing surfaces by altering the axial length of the sleeve member 10 can be accommodated by replacing the collars 16 and 16a by similar collars of appropriate axial length.

In the bearing assemblies shown in FIGS. 1 to 4, the sleeve members 9 and 10 are secured to a shaft and are preferably used in cases where the shaft is to be rotated within the outer bearing member whilst the latter is secured to a stationary housing. In the modification shown in FIG. 6 the recesses 5 in the frusto-conical bearing surfaces are formed in the sleeve members 9 and 11 and the restrictors 6 and associated fluid passages for the recesses are located in the sleeve members. The construction shown in FIG. 6 may conveniently be utilised in cases where the sleeve members are to be secured to a stationary shaft and the outer bearing member 1 is to be secured to a housing which is adapted to be rotated on the shaft as above described in connection with FIG. 5.

As will be appreciated from the aforegoing description it is preferred that the peripherally spaced arrays of recesses between the opposing frusto-conical bearing surfaces are formed in the frusto-conical bearing surfaces which are intended to be stationary since this avoids the necessity of providing additional features such as valves or the like to ensure that hydraulic fluid under pressure can be maintained in the recesses.

In the above described embodiments two sets of peripherally spaced recesses are provided, one set between the opposed frusto-conical surfaces 2 and 9a and the other set between the opposed frusto-conical surfaces 3 and 11a. Preferably the two sets of hydrostatic pads are identical but are arranged to be peripherally offset with respect to each other in the assembly so that the hydrostatic pads in one set are axially out of alignment with the hydrostatic pads in the other set to the extent that each hydrostatic pad in one set partly overlies, in the peripheral sense, two adjacent hydrostatic pads in the other set. Such a construction is illustrated in FIGS. 7 and 8 in which the two sets of peripherally spaced arrays of recesses 5 in the outer bearing member 1 are axially out of alignment as above described. By offsetting the hydrostatic pads between each pair of opposed frusto-conical surfaces the location effect of the hydrostatic pads is effectively doubled in a radial sense; for example, in the embodiment shown in FIGS. 1 and 1A to 1C, each of the frusto-conical bearing surfaces 2 and 3 incorporates six peripherally spaced recesses 5 and if the recesses were to be located in axial alignment only six hydrostatic pad locations would be provided, however, by axially offsetting the recesses 5 as shown, twelve hydrostatic pad locations are provided. It will be appreciated that this technique for increasing the effective number of pad locations in a radial sense can be applied irrespective of the number of hydrostatic pads which are provided in the frusto-conical bearing surfaces.

As above mentioned, fluid leakage from the hydrostatic pads is relieved from the opposed frusto-conical surfaces through the annular relief channels 14 and 4. Additional relief can be effected by providing, in the frusto-conical surfaces having the peripherally spaced array of recesses, an array of axially extending channels 31 (see FIG. 8) which communicate between the annular channels 4 and 14 and are preferably located one between each adjacent pair of peripherally spaced recesses 5.

In conditions where the sleeve members 9 to 11 are to be clamped to a stationary shaft the hydrostatic pads between the frusto-conical bearing surfaces are preferably located in recesses provided in the frusto-conical bearing surfaces of the sleeve members 9 and 11. Conveniently such recesses in the frusto-conical surfaces 9a and 11a are identically formed and one such surface 9a is partly shown in FIG. 9. Preferably the arrays of recesses in the frusto-conical bearing surfaces 9a and 11a are axially out of alignment when the sleeve members 9 to 11 are secured to a shaft (in a similar manner to the recesses 5 in FIGS. 7 and 8). To ensure that the correct phasing between the two sets of peripherally spaced recesses is obtained, the three sleeve members 9 to 11 can be provided with locating means, for example, in the form of complementary engaging castellations and projections (not shown) which, when engaged, locate the recesses 5 in the required offset relationship prior to the sleeve members being secured to the shaft.

In the construction shown in FIG. 10, which is a modification of the sleeve members shown in FIG. 1, the spacer means provided by the sleeve member 10 in FIG. 1 is replaced by spacer means which comprises a pair of adjustably connected sleeve elements 10a and 10c. The sleeve elements 10a and 10c are carried on the shaft axially between the frusto-conical sleeve members 9 and 11. The sleeve element 10a abuts the sleeve 9 and has an external screw thread and the sleeve element 10c abuts the sleeve 11 and has an internal screw thread which is complementary to, and is in engagement with, the screw thread of element 10a. It will be apparent that, during assembly of the bearing, the axial length of the spacer means can be adjusted to a predetermined length to provide a required clearance between the opposed frusto-conical surfaces by screw adjustment between the sleeve elements 10a and 10c. The sleeve element 10a carries an internally screw threaded ring 10b which is in screw thread engagement therewith. The ring 10b effectively provides a lock by which the sleeve elements 10a and 10c can be secured together after adjustment of the spacer means to a required axial length thereby preventing accidental adjustment of the spacer means either during assembly of the bearing or during use as a result of vibration. Alternative means of securing the sleeve elements 10a and 10c can be used as are known in the art, for example, a grub screw (not shown). Although it is preferred that the engaging sleeve elements 10a and 10c are freely mounted on the shaft, if required, the sleeve element 10a can be secured to, or formed integral with the sleeve member 9 and the sleeve element 10c can be secured to, or formed integral with the sleeve member 11.

It is to be realised that the spacer means as above described with reference to FIG. 10 can be incorporated in each of the several bearing assemblies described with reference to the drawings.

Referring now to FIG. 11, which illustrates a modification of the assembly shown in FIG. 1, the flange 1a of the outer bearing member 1 is provided with an annular extension 113a which is co-axial with the frusto-conical bearing surfaces of the outer member 1 and extends axially over the flange 101 of the outer sleeve member 11. Mounted as a close sliding fit in the annular extension 113a and adjacent the side face 121 of the flange 101 is an annular thrust plate 200 having an axially directed side face 201 located oppositely to the side face 121 of the flange 101. The side faces 121 and 201 provide a pair of opposed thrust bearing surfaces and located in the face 201 are a peripherally spaced array of recesses 202. The recesses communicate through a passage 203 in the plate 200 to be in permanent communication with the passage 15a in the outer bearing member 1. When fluid under pressure is passed through restrictor 15 and passages 15a and 203 a hydrostatic pad is formed in each of the recesses 202 (with the same effect as the pads formed in recesses 122 in FIG. 1). Further, the thrust plate 200 can be moved relative to the extension 113a through an axial distance which is dictated by the ports of passages 15a and 203 remaining in communication, thereby providing means for adjusting the axial clearance between the opposed side faces 121 and 201.

The thrust plate 200 is retained in the annular extension 113a by an annular adjustment plate 204. The plate 204 is externally screw threaded and engages at 205 with a complementary internal screw thread on the extension portion 113a. Axial adjustment or positioning of the thrust plate 200 to determine the clearance between faces 121 and 201 is controlled by axial screw adjustment of the adjustment plate 204, this adjustment conveniently being made by a peg wrench which engages with holes 206 in plate 204. After adjustment, the axial position of the adjustment plate 204 may be fixed relative to the extension portion 113a by an annular locking plate 207. The plate 207 is externally screw threaded and engages at 208 with the internal screw thread on the extension portion 113a. Adjustment of the plate 207 is conveniently made by a peg wrench which is engageable with holes 209 in the plate.

It will be apparent that when the thrust plate 200 is set and the plates 204 and 207 locked, the maximum axial clearance available between the opposed side faces 103 and 201 of the outer bearing member is set but that such clearance may be re-adjusted as required to optimise the bearing assembly. By such an arrangement the auxiliary spacer element 28 as used in FIG. 1 may be eliminated.

What I claim is:

1. A hydrostatic bearing assembly, comprising a shaft; a plurality of sleeve members removably secured to said shaft in axial relationship; an outer bearing member, said outer bearing member and said shaft being adapted for relative axial rotation; said sleeve members being disposed within said outer member, each of said sleeve members having a frusto-conical external bearing surface adapted to provide a bearing surface for said shaft, and said outer bearing member having a pair of frusto-conical internal bearing surfaces disposed in opposed complementary relationship to said sleeve member bearing surfaces to provide restraint against relative axial movement between said outer bearing member and said shaft; sleeve spacer means axially disposed between said sleeve members for achieving a desired clearance between said frusto-conical bearing surfaces of said sleeve members and said respectively opposed frusto-conical bearing surfaces of said outer member; recess means and fluid passage means adapted for connection to a source of hydraulic fluid under pressure, said recess means forming hydrostatic pads between said opposed frusto-conical surfaces to permit relative axial rotation between said outer bearing member and said shaft; further comprising first auxiliary bearing means located between said outer bearing member and one of said sleeve members and being adapted to provide restraint to relative axial movement between said outer bearing member and said shaft while permitting axial rotation therebetween; and still further comprising first spacer means operatively associated with said first auxiliary bearing means and removably secured between said one sleeve member and said outer bearing member; wherein said first spacer means maintains a desired clearance between said one sleeve member and said outer bearing member which desired clearance is consistent with operation of said first auxiliary bearing means and of said hydrostatic pads.

2. The hydrostatic bearing assembly of claim 1, wherein said first spacer means comprises an annular collar.

3. The hydrostatic bearing assembly of claim 1, further comprising first and second thrust faces, said first thrust face being disposed on said outer bearing member, said second thrust face being disposed on one of said sleeve members, said first and second thrust faces being in substantially opposed relationship to each other and substantially normal to the axis of said sleeve member bearing surfaces; said first auxiliary bearing means being axially disposed to react through said substantially opposed thrust faces.

4. The hydrostatic bearing assembly of claim 3, further comprising means to adjust said first and second opposed thrust faces to provide a required clearance between said opposed complementary frusto-conical bearing surfaces.

5. The hydrostatic bearing assembly of claim 4, wherein one of said first and second opposed said thrust faces is axially adjustable on the member which carries it to adjust the axial clearance between said first and second opposed thrust faces; and means is further provided for securing said one thrust face with respect to the member which carries it whereby said thrust faces may be retained at a desired axial clearance relative to each other.

6. The hydrostatic bearing assembly of claim 3, wherein said first spacer means operatively associated with said first auxiliary bearing means is removably secured between one of said sleeve members and said outer bearing member; said first auxiliary bearing means and said first spacer means being located between said first and second opposed thrust faces and axially disposed relative thereto.

7. The hydrostatic bearing assembly of claim 3, further comprising second auxiliary bearing means disposed between said outer bearing member and one of said sleeve members, and third and fourth substantially opposed thrust faces disposed one on said outer bearing member and one on one of said sleeve members; said third and fourth opposed thrust faces being substantially normal to the axis of said frusto-conical bearing surfaces, and said second auxiliary bearing means being disposed between said second pair of opposed thrust faces; said second auxiliary bearing means being adapted to inhibit relative movement of said third and fourth opposed thrust faces axially towards each other.

8. The hydrostatic bearing assembly of claim 7, further comprising means for adjusting axial clearance between said third and fourth opposed thrust faces, thereby maintaining efficient operation of said second auxiliary bearing means.

9. The hydrostatic bearing assembly of claim 7, wherein said first auxiliary bearing means is disposed between said outer bearing member and one of said sleeve members and said second auxiliary bearing means is disposed between said outer bearing member and the other of said sleeve members; further comprising second spacer means operatively associated with said second auxiliary bearing means and removably secured between said sleeve member associated with said second auxiliary bearing means and said outer bearing member whereby said second auxiliary bearing means reacts through said second spacer means to restrain relative axial movement between said outer bearing member and said shaft.

10. The hydrostatic bearing assembly of claim 7, furture comprising an external flange disposed on at least one of said sleeve member and extending therefrom at a position adjacent the end part of largest diameter of said sleeve member; at least one of said thrust faces being of substantially annular form and disposed on said external flange.

11. The hydrostatic bearing assembly of claim 7, wherein said first and second auxiliary bearing means are disposed between said outer bearing member and a common sleeve member; further comprising an external flange through which said first and second auxiliary bearing means react in opposed axial directions, said external flange being of substantially annular form and extending from said common sleeve member at a position adjacent the end part of largest diameter of said common sleeve member; said first auxiliary bearing means being disposed between said outer bearing member and one side of said flange and said second auxiliary bearing means being disposed between said outer bearing member and the axially opposite side of said flange; one side face of said annular flange providing one thrust face for said first and second opposed thrust faces and the other side face of said annular flange providing one thrust face for said third and fourth opposed thrust faces; said outer bearing member comprising an extension portion projecting therefrom to axially overlie said annular flange of said common sleeve member, said extension portion carrying an inwardly directed flange having a thrust plate substantially normal to the axis of said outer bearing member, the thrust face on said outer bearing member providing the other thrust face for said first and second opposed thrust faces and the thrust plate on said extension portion providing the other thrust face for said third and fourth opposed thrust faces.

12. The hydrostatic bearing assembly of claim 11, further comprising means to adjust said first and second opposed thrust faces and means to adjust said third and fourth opposed thrust faces; said thrust plate carried on said inwardly directed flange being axially adjustable with respect to said extension portion to adjust the axial clearance between opposed thrust faces carried on said outer bearing member and extension portion thereof, and still further comprising means for securing said thrust plate relative to said extension portion to maintain a predetermined axial clearance from said thrust face carried by said outer bearing member.

13. The hydrostatic bearing assembly of claim 1, further comprising second auxiliary bearing means between said outer bearing member and one of said sleeve members, said second auxiliary bearing means being adapted to restrain axial movement between said outer bearing member and said shaft.

14. The hydrostatic bearing assembly of claim 13, wherein said second auxiliary bearing means comprises a roller bearing.

15. The hydrostatic bearing assembly of claim 13, wherein said second auxiliary bearing means comprises a hydrostatic bearing; and further comprising auxiliary recess means which communicates with auxiliary fluid passage means connected to a source of hydraulic fluid under pressure to form hydrostatic pads for said second auxiliary bearing means.

16. The hydrostatic bearing assembly of claim 15, wherein said auxiliary fluid passage means includes fluid restrictors disposed therein.

17. The hydrostatic bearing assembly of claim 13, wherein said auxiliary recess means and said second auxiliary bearing means comprises, in combination, a plurality of peripherally spaced hydrostatic pads.

18. The hydrostatic bearing assembly of claim 13, wherein said first auxiliary bearing means is disposed between said outer bearing member and one of said sleeve members and said second auxiliary bearing means is disposed between said outer bearing member and the other of said sleeve members.

19. The hydrostatic bearing assembly of claim 13, wherein said first and second auxiliary bearing means are disposed between said outer bearing member and a common sleeve member; whereby said first and second bearing means react between said outer bearing member and said common sleeve in opposite senses of axial direction.

20. The hydrostatic bearing assembly of claim 19, further comprising an external flange through which said first and second auxiliary bearing means react in opposed axial directions, said flange being mounted on said common sleeve member, said first auxiliary bearing means being disposed between said outer bearing member and one side of said flange and said second auxiliary bearing means being disposed between said outer bearing member and the axially opposite side of said flange.

21. The hydrostatic bearing assembly of claim 1, wherein said first auxiliary bearing means comprises a roller bearing.

22. The hydrostatic bearing assembly of claim 1, wherein said first auxiliary bearing means comprises a hydrostatic bearing; and further comprising auxiliary recess means which communicates with auxiliary fluid passage means connected to a source of hydraulic fluid under pressure to form hydrostatic pads for said first auxiliary bearing means.

23. The hydrostatic bearing assembly of claim 22, wherein said auxiliary fluid passage means includes fluid restrictors disposed therein.

24. The hydrostatic bearing assembly of claim 22, wherein said auxiliary recess means and said first auxiliary bearing means comprises, in combination, a plurality of peripherally spaced hydrostatic pads.

25. The hydrostatic bearing assembly of claim 1, wherein said sleeve spacer means comprises at least two adjustably connected elements, by means of which the axial length of said sleeve spacer means can be adjusted.

26. The hydrostatic bearing assembly of claim 1, wherein said clearance maintaining sleeve spacer means comprises at least two sleeve elements in screw threaded engagement to permit adjustment of the axial length of said sleeve spacer means, said sleeve elements being mounted on said shaft axially between, and in abutting relationship with, said sleeve members.

27. The hydrostatic bearing assembly of claim 1, wherein said sleeve spacer means comprises at least one element of predetermined axial length removably secured on said shaft axially between, and in abutting relationship with, said sleeve members.

28. The hydrostatic bearing assembly of claim 1, wherein said recess means comprises a plurality of peripherally spaced hydrostatic pads between each pair of complementary frusto-conical bearing surfaces.

29. The hydrostatic bearing assembly of claim 28, further comprising a plurality of peripherally spaced recesses in each of said frusto-conical surfaces of said outer bearing member, and fluid passage means to said recesses disposed in said outer bearing member.

30. The hydrostatic bearing assembly of claim 29, wherein said plurality of peripherally spaced recesses are out of alignment in an axial sense and each recess in one of said frusto-conical surfaces partly overlies, in a peripheral sense, two recesses in the other of said frusto-conical surfaces.

31. The hydrostatic bearing assembly of claim 29, further comprising fluid restrictors carried in said outer bearing member and disposed in said fluid passage means.

32. The hydrostatic bearing assembly of claim 29, furthere comprising channel means between each pair of opposed complementary bearing surfaces and recess means disposed in said frusto-conical surfaces; wherein said channel means comprises a plurality of axially spaced peripheral recesses between which said recess means is located and an array of substantially axially extending channel means which communicate between said axially spaced peripheral recesses.

33. The hydrostatic bearing assembly of claim 1, further comprising a plurality of peripherally spaced recesses in the frusto-conical surface of each said sleeve member; and fluid passage means to said recesses disposed in each said sleeve member.

34. The hydrostatic bearing assembly of claim 33, further comprising complementary engaging means incorporated in said sleeve members whereby, when said sleeve members are located on said shaft in abutting and axial relationship, said complementary engaging means locates said sleeve members relative to each other and in a position in which said peripherally spaced recesses of said sleeve members are out of alignment in an axial sense and each recess in the frusto-conical surface of one said sleeve member partly overlies, in a peripheral sense, two recesses in the frusto-conical surface of said other sleeve member.

35. The hydrostatic bearing assembly of claim 33, further comprising fluid restrictors carried in said sleeve members and disposed in said fluid passage means.

36. The hydrostatic bearing assembly of claim 1, further comprising channel means between each pair of opposed complementary bearing surfaces and recess means disposed in certain of said frusto-conical surfaces; said channel means being disposed in said certain of said frusto-conical surfaces and being adapted to relieve hydraulic fluid leakage from said hydrostatic pads between said opposed complementary bearing surfaces.

References Cited
UNITED STATES PATENTS

| | | | |
|---|---|---|---|
| 2,517,231 | 8/1950 | Paul | 308—70 |
| 2,919,960 | 1/1960 | Whitney | 308—122 |
| 1,909,135 | 5/1933 | Svenson | 208—70 |

MARTIN P. SCHWADRON, Primary Examiner

F. SUSKO, Assistant Examiner

U.S. Cl. X.R.

308—35